United States Patent [19]

Hubbard et al.

[11] 3,997,039
[45] Dec. 14, 1976

[54] LOOPED CABLE CARRIER

[75] Inventors: Terrence Hubbard, Little Eaton; Gladwyn Raymond Hunt, Oakerthorpe, both of England

[73] Assignee: Perard Engineering Limited, United Kingdom

[22] Filed: Jan. 30, 1975

[21] Appl. No.: 545,470

[30] Foreign Application Priority Data

Jan. 31, 1974 United Kingdom ............... 4513/74
Mar. 29, 1974 United Kingdom ............ 13927/74

[52] U.S. Cl. .................. 191/12 R; 137/355.28; 299/43
[51] Int. Cl.² ........................................ B65H 57/02
[58] Field of Search ............... 137/355.16, 355.28; 191/12 R; 242/157 R, 157.1; 248/49, 51, 52, 69 R; 299/18, 19, 32, 34, 43

[56] References Cited

UNITED STATES PATENTS

| 3,113,763 | 12/1963 | Wendt et al. ................. 299/43 |
| 3,721,378 | 3/1973 | Hughes et al. ................ 299/34 |
| 3,861,751 | 1/1975 | Erwen ..................... 299/34 X |

FOREIGN PATENTS OR APPLICATIONS 1,220,872  1/1971  United Kingdom

*Primary Examiner*—Stephen G. Kunin
*Attorney, Agent, or Firm*—William Anthony Drucker

[57] ABSTRACT

A carrier for a looped cable used to supply power or water to a winning machine in a mine in which a gate is mounted on a body for movement into an open and a closed horizontal position. The body is resiliently mounted on a carrier.

12 Claims, 8 Drawing Figures

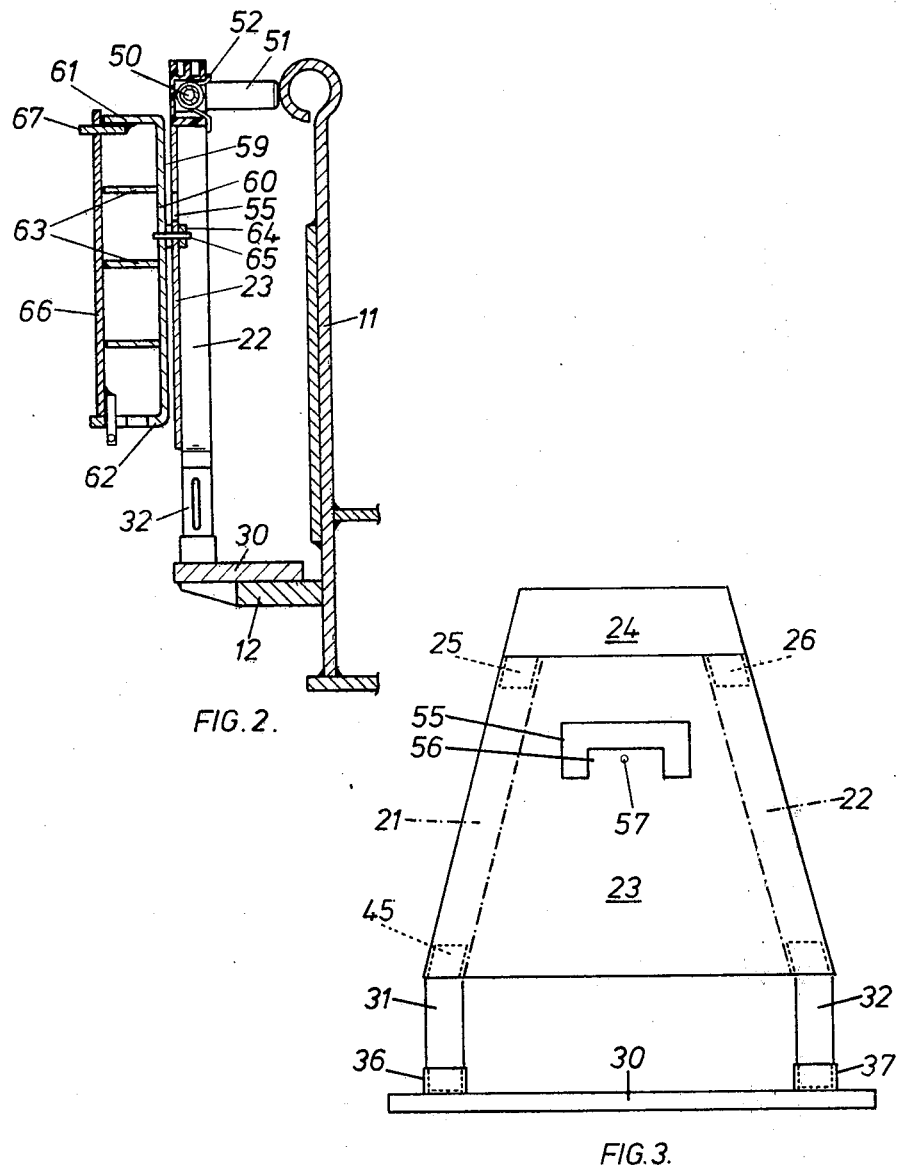

LOOPED CABLE CARRIER

This invention relates to looped cable carriers.

U.S. Pat. No. 3,574,403 describes and claims a carrier for looped cables used to supply power and water to mining machines which traverse to and fro along a mineral face, which carrier is adapted for securement to a spill plate associated with a face conveyor or to a clevis rail attached to a spill plate and comprises a loop carrier portion and a gate mounted for displacement about an axis and biased to a closed position, so that with the gate in a closed position an enclosed region to accommodate the looped cables is defined by the loop carrier, together with the gate in a closed position, or, in use, an enclosed region is defined between the spill plate, the loop carrier and said gate in a closed position.

In a mine, the carriers are liable to be struck by heavy objects causing breakage and the present invention provides an improved carrier to reduce the risk of such damage.

From one aspect, the present invention provides a carrier according to claim 1 of U.S. Pat. No. 3,574,403 in which the loop carrier portion includes a body portion on which the gate is mounted for angular movement and a resiliently flexible portion adapted for mounting on the clevis rail so as to support the body portion.

In this specification, the term "clevis rail" is used to mean any extension out of the plane of the spill plate.

From another aspect, the invention resides in a carrier for a looped cable used to supply power or water to a winning machine which traverses along a mineral face, which carrier comprises mounting means adapted for attachment to a clevis rail (as herein defined), a body, resiliently flexible means between the body and the mounting means so that, in use, the body is resiliently movable towards the spill plate and a gate mounted for displacement about an axis and biased to a closed position, so that, with the gate in the closed position, an enclosed region to accommodate the looped cable is defined, in use, between the spill plate and the carrier including the gate in the closed position.

From a further aspect, the invention resides in a carrier for a looped cable used to supply power or water to a winning machine which traverses along a mineral face, which carrier comprises a body, a gate mounted on the body for angular movement relative to the body between open and closed positions, mounting means adapted for mounting the carrier on a horizontal surface whereby the body is supported above that surface, and resiliently flexible means between the mounting means and the body permitting resilient movement of the body relative to the mounting means, the gate in its closed position projecting, in use, parallel to said horizontal surface.

In one embodiment, the resiliently flexible means is arranged to permit flexing of the body portion in one direction away from the normal position, means being provided to resist such flexing in other directions. In such an arrangement, the portion may be a thin resiliently flexible strip which is flexible in two opposite directions and comparatively inflexible perpendicular thereto, a stop being provided to prevent such flexing in one of those directions. The strip could be a leaf spring, but preferably is a strip of natural rubber, synthetic rubber or plastics material.

In one embodiment, the stop and the strip are integral parts of a single element consisting of a hollow block having two generally parallel, spaced arms, one of which defines the stop and the other of which is split to permit flexing of the strip by opening of the split, the edges of the split serving as co-operating stops to permit flexing in the opposite direction.

In an alternative embodiment, the resiliently flexible means is a solid block of material and in yet a further embodiment, the resiliently flexible means is a length of tubing.

In another embodiment of the invention, the resiliently flexible means is adapted at both opposite ends for attachment to the clevis rail with the body portion secured to the flexible means intermediate its ends, whereby, in use, the flexible means is curved with the body at the crown of the curve. The flexible means may have two sections, each secured to the body at one end and each adapted for mounting on the clevis rail at the opposite end, the two sections together with the body defining the curve. An additional flexible member may be secured to the body so as to bisect the curve, this member being adapted for attachment to the clevis rail.

In each of the embodiments described above, the gate is preferably resiliently biased into the closed position and in the position of use of the carrier, the gate may move angularly in a plane either generally parallel to the horizontal surface or perpendicular to said surface. The gate is preferably hinged by a pivot pin to the body, but may be made of resiliently flexible material so that flexing permits the angular movement.

The invention may also reside in apparatus for controlling a looped cable used to supply power or water to a winning machine which traverses along a mineral face, which apparatus includes at least one spill plate provided with a horizontal extension out of the plane of the spill plate, and one or more looped cable carriers as defined above mounted on the horizontal extension, so that an enclosed region to accommodate the looped cable is defined between the spill plate and the carrier, including the gate in its closed position.

Reference is now made to the accompanying drawings, wherein:

FIG. 2 is a sectional view on the line 2—2 of FIG. 1;

FIG. 3 is a rear elevation of the carrier of FIG. 1 with a static cable support thereof removed;

Figure 1:
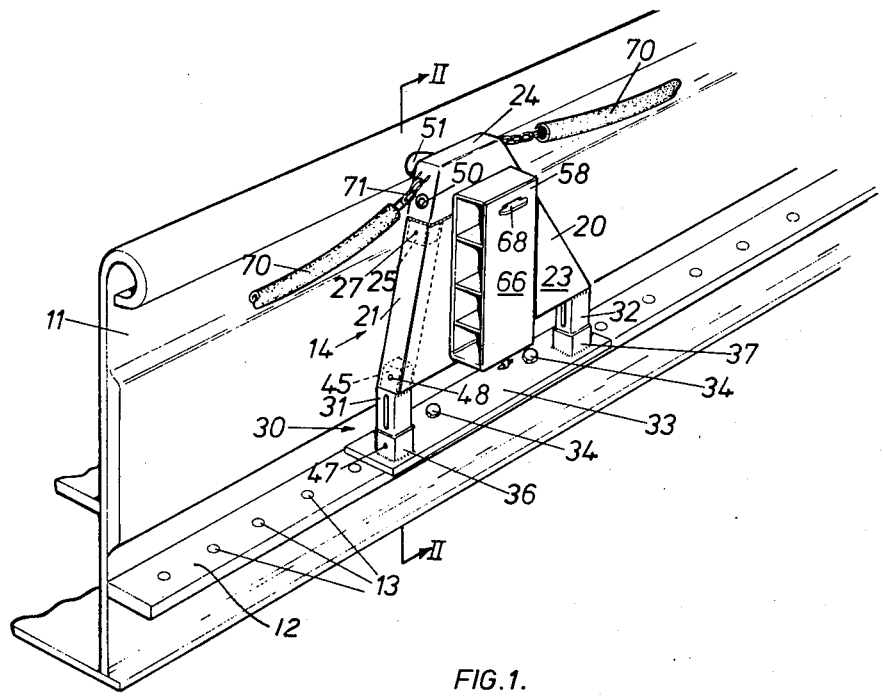
FIG. 1 is a perspective view of a spill plate, provided with a first embodiment of a cable carrier according to the invention.

Referring to FIG. 1, there is shown a spill plate 11 provided with a horizontal extension defining a clevis rail 12 for connection to a self-advanceable mine roof support. The clevis rail is provided with apertures 13, to permit such connection. In use, the spill plate is arranged in alignment with others alongside an armoured face conveyor at a coal face and the plates serve to prevent spillage of coal beyond the region containing the conveyor. A coal cutting machine rides on top of the conveyor and is usually electrically operated. A cable supplying electrical power is connected to the machine and is trailed by the machine. The cable leads from a point mid-way along the coal face, since the machine traverses in both opposite directions along the face. The cable is caused to be looped during such a traverse and is liable to be damaged by sharp articles. The spill plates are provided with cable carriers, such as that designated 14 in FIG. 1, which serve to control the cable to reduce the risk of damage. An arrangement of this type is described in U.S. Pat. No. 3,574,403, but the cable carriers described therein are of different construction.

Each cable carrier 14 comprises a body 20 made in this case of metal. The body is of trapezium form and comprises two square-section tubes 21, 22 with open socket ends which are axially relatively inclined and interconnected by a plate 23 of trapezium form (see FIGS. 1, 2 and 3).

The carrier includes a head 24, moulded of plastics and shaped to form a continuation of the trapezium form at the reducing-width top end of the body. The head has a pair of spigots 25, 26, each of which is a close fit in a respective one of the tubes 21, 22. The spigots are held in position by pins or screws such as 27.

The carrier also includes a base 30 and two support members 31, 32. The base comprises a base plate 33, which has apertures receiving bolts 34, which engage additionally in the apertures 13 in the clevis rail 12 for mounting the carrier on the rail. The base includes a pair of upstanding socket members 36, 37.

The support members 31, 32 are made of a resilient plastics material and are elongate, square-section block-like members. One of the support members 31 is most clearly illustrated in FIG. 4 and the support members are identical in construction. The support member 31 is provided with a solid base portion 39 provided with a transverse bore 40. The remainder of the block formation is formed with an elongate aperture 41 extending lengthwise of the support member and defining a pair of spaced parallel arms 42, 43. This portion of the member is provided with an extension of relatively reduced transverse dimensions defining a spigot 45. The spigot 45 is inclined to the remainder of the support member and is provided with a transverse bore 46.

The base portion 39 is complementary to and seats in one of the socket members 36 (FIG. 3) and a pin or screw 47 (FIG. 1) holds the base portion 39 in the socket member. Similarly, the spigot 45 is complementary to the tube 21 and engages therein and is held in engagement by a pin or screw 48.

The head 24 is hollow and mounts in its hollow a pivot pin 50. A gate 51 of tubular form is pivotally mounted on the pin 50 for pivotal movement in a vertical direction. The top of the head serves as a stop to limit upward movement of the gate to a horizontal orientation. A torsion spring 52 is mounted on the shaft and engages between the body of the head and the gate to urge the gate into the horizontal position. The gate may be made of a resilient material such as rubber.

The plate 23 of the body 20 has an apertured part 55 defining an upstanding tongue 56 provided with an aperture 57. The tongue 56 serves to mount a static cable support 58. This support comprises a body 59 (FIG. 2) comprising a back plate 60 and top and bottom plates 61, 62. Between these top and bottom plates are mounted shelves 63 for supporting static cables.

The back plate carries a bracket 64 which engages over the tongue 56 to mount the support on the body 20. A pin 65 optionally holds the support in position.

The static cable support includes a door 66 pivotally mounted on a peg 67 on the body, the peg having a head 68 (FIG. 1) engaging the door.

As apparent from FIGS. 1 and 2, with the carrier mounted on the clevis rail, the gate 51 closes the top of a channel defined by the body 20, the clevis rail 12 and the spill plate 11, this enclosed region accommodating, in use, the looped cable leading to the coal cutting machine. The carriers are connected, each with the next carrier by a flexible tie 70 formed from a length of hose with a chain 71 at each end. The chains permit adjustment in length of the tie.

In use, static cables housed in the static cable supports of the carriers, together with the ties 70 and the carriers define a wall of a channel and help to retain the looped cable.

When the machine is operating, the feed cable is trailed alongside the spill plates within the channel and as it approaches each carrier reaches a stage wherein the cable exerts pressure on the gate 51 of the carrier. The gate opens and permits the cable to enter the enclosed region, the gate closing under its spring bias to trap the cable. Eventually, a position is reached in which the cable is fully stretched out within the enclosed regions of the carriers. On reversal of the direction of movement of the machine, the cable is looped and the upper stretch of the loop engages with the gates and enters the enclosed regions, so that both stretches of the cable are housed therein. Uncontrolled snaking of the cable is, thereby, avoided with reduced risk of damage to the cable. This operation is fully described in U.S. Pat. No. 3,574,403.

The resilient support members 31, 32 permit the carrier to be struck with reduced risk of damage. The gate is also resiliently flexible and less likely to be damaged than a metal part when the support members allow the carrier to be knocked towards the spill plate. The ties are sufficiently resilient not to impede resilient movement of the body of the carrier.

Figures 4, 5:
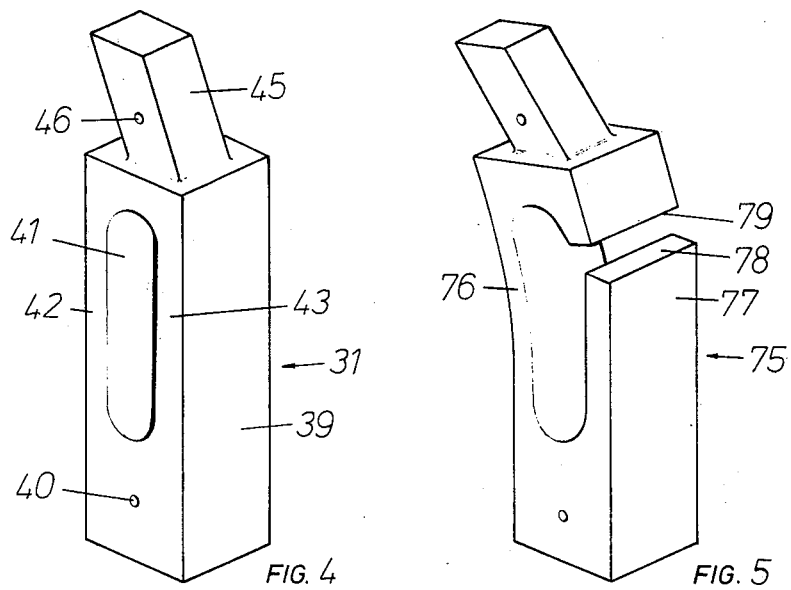
FIG. 4 is a perspective view of a support member of the carrier.
FIG. 5 is a perspective view of a modification of the support member of FIG. 4.

Referring to FIG. 5, there is shown a modified support member 75 which is identical with the members 31, 32, except that one of the arms is split. The member 75 has two parallel arms 76, 77, that which lies further spaced from the spill plate, in use, being split so as to define two abutment surfaces 78, 79. In use, the resilient flexibility towards the spill plate is increased, since the arm 77 provides no resistance to bending. On the other hand, flexibility in the opposite direction is substantially unchanged from the embodiment shown in FIG. 4, since the abutment surfaces 78, 79 are urged together, and resistance to bending is greater in this direction. This reduces the risk of damage to static cables held in the supports 58.

Figure 6:
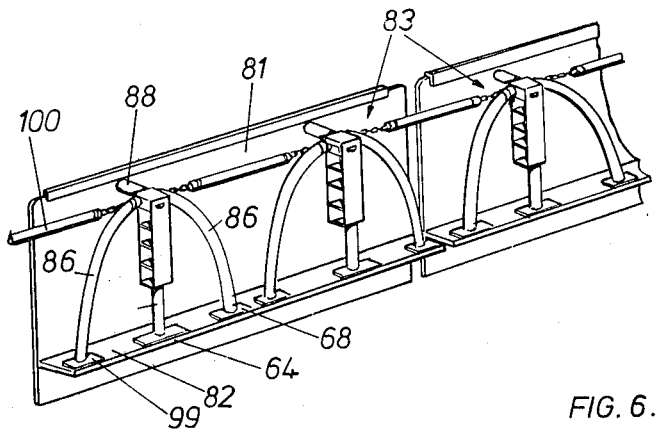
FIG. 6 is a view similar to FIG. 1 of a spioo plate mounting cable carriers according to a further embodiment of the invention.
Figure 7:
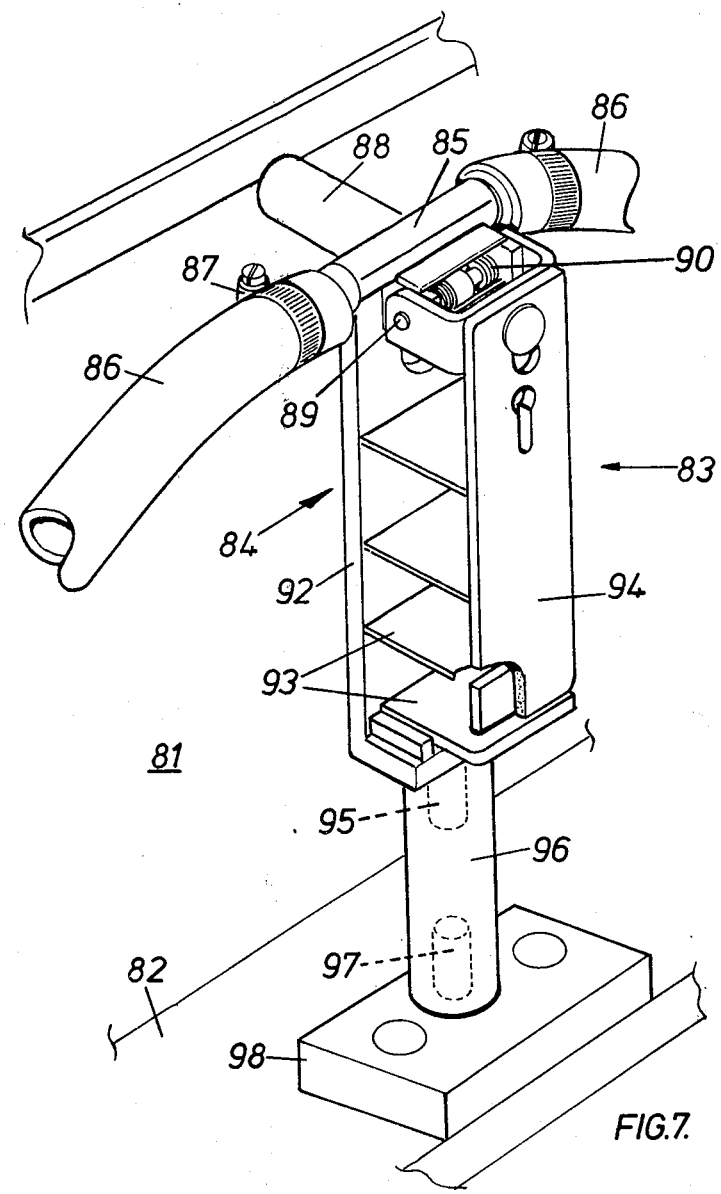
FIG. 7 is an enlarged perspective view of one of the carriers of FIG. 6.

Referring now to FIGS. 6 and 7 there is shown in FIG. 6, a spill plate 81 and a clevis rail 82 on which are mounted looped cable carriers 86. Each carrier comprises a body 84 having a bar 85 defining at opposite sides of the body spigots which engage in respective hose sections 86. These hose sections engage at their opposite ends with spigots carried by mounting plates 99, which are mounted on the clevis rail. The hose sections are held in position by adjustable sleeve clamps 87. The body mounts a gate 88 mounted on a pin 89 for pivotal vertical movement. A torsion spring 90 biases the gate to the closed position illustrated, in a similar manner to the previously described embodiment. The bar 85 serves as the stop limiting upward pivotal movement of the gate 88. The hose sections together define a generally semi-circular curve in a plane perpendicular to the gate in its closed position.

The body includes an L-shaped plate member 92 which mounts shelves 93 for supporting static cables. A door 94 is also provided in the same manner as shown in FIGS. 1 and 2.

The L-shaped plate member 92 has a downwardly projecting boss 95, which is received in one end of a hose section 96, made of resiliently flexible material such as rubber or a plastics material. The other end of the hose section engages with a boss 97 provided on a base block 98, which is bolted to the clevis rail 82.

In use, the carrier operates in a similar manner to that previously described. The hose section 96 provides the resilience reducing the risk of damage on impact and the hose sections 86, as well as serving to define, together with the carriers, the clevis rail and the spill plate, the channel or trough, which receives the looped feed cable, also serve to assist support of the carrier. Between the carriers, flexible links 100 are provided as in the previously described embodiment.

Figure 8:
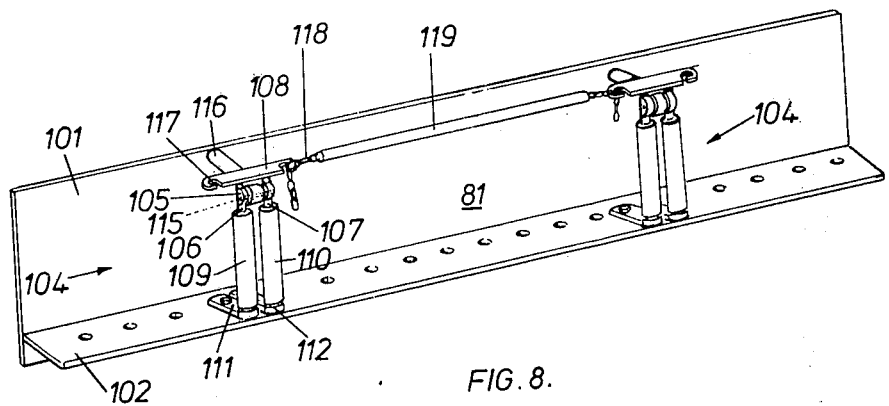
FIG. 8 is a view similar to FIG. 6, showing cable carriers, according to a further embodiment, mounted on a spill plate.

A further embodiment is illustrated in FIG. 8. Again, a spill plate 101 is provided with a clevis rail 102 which mounts looped cable carriers 104. Each carrier comprises a body 105 which includes two vertical bars 106, 107 interconnected by an arm 108. The bars 106, 107 engage in parallel hose sections 109, 110, in turn mounted on bosses on base plates 111, 112. These base plates are bolted to the clevis rail 102. The bars 106, 107 mount between them a horizontal pin 115 which mounts a gate 116 for vertical pivotal movement. The arm 108 serves as the stop for the gate, which is spring biased as previously described with respect to the other embodiments. The arm 108 has a hook 117, 118 at each end to which are connected flexible links 119 as in the other embodiments.

In this embodiment, both hose sections 111, 112 serve to permit resilient movement of the carriers on impact.

In each embodiment, the gate may be horizontally movable in both opposite angular directions from a central closed portion to which it is biased by springs. Such an arrangement is disclosed in U.S. Pat. No. 3,574,403.

What we claim is:

1. A carrier for a looped cable used to supply power or water to a winning machine which traverses along a mineral face, which carrier comprises a body, a gate mounted on the body for angular movement relative to the body between open and closed positions, mounting means adapted for mounting the carrier on a horizontal surface whereby the body is supported above that surface, the gate in its closed position projecting, in use, parallel to said horizontal surface, wherein the improvement resides in at least two elongate spaced blocks of resilient material each connected to and extending longitudinally between the body and said mounting means, so as flexibly to support the body.

2. A carrier according to claim 1, wherein each block is formed with an aperture defining a pair of spaced arms each connected between the body and the mounting means.

3. A carrier according to claim 2, wherein one of the arms is split into two portions each having an abutment surface which engages with the abutment surface of the other portion, one arm of each pair lying in a plane nearer to the gate than the other arm of the pair, the arm of the pair further from the gate being that with the split.

4. A carrier according to claim 1, wherein the body includes a pair of sockets each of which receives a spigot of a respective one of the blocks.

5. A carrier according to claim 1, wherein the mounting means includes a pair of sockets, each of which receives one of the blocks.

6. A carrier according to claim 5, wherein each socket is mounted on a plate adapted for bolting to a clevis rail.

7. A carrier according to claim 1, wherein the body includes a main portion mounted on the blocks, and a relatively resilient head portion which carries the gate.

8. A carrier according to claim 7, wherein the main portion comprises two convergent tubular members joined together by a plate, each tubular member defining a socket at its lower end which receives a spigot of a respective one of the blocks, and each tubular member also defining a socket at its upper end which receives a spigot of the head portion.

9. A carrier, for a looped cable used to supply power or water to a winning machine which traverses along a mineral face, comprising:
 a body
 a gate mounted on the body for angular movement relative to the body between open and closed positions, mounting means adapted for mounting the carrier on a horizontal surface whereby the body is supported above that surface, at least one resiliently flexible hose section between the mounting means and the body permitting resilient movement of the body relative to the mounting means, and wherein the gate in its closed position projecting, in use, parallel to said horizontal surface.

10. A carrier according to claim 9, wherein the resiliently flexible means comprises a pair of parallel hose sections which extend in a plane perpendicular to the gate in its closed position.

11. A carrier according to claim 9, wherein the resiliently flexible means comprises a pair of hose sections connected to opposite sides of the body, so as to extend in a plane perpendicular to the gate in its closed position, whereby with the carrier mounted on a clevis rail the hose sections together define a generally semi-circular curve.

12. A carrier according to claim 11, including a further hose section between the mounting means and the body and arranged bisecting said generally semi-circular curve.

* * * * *